Dec. 11, 1956  J. C. PIRTLE  2,773,749
TOWER AGITATION SYSTEM
Filed April 16, 1953  2 Sheets-Sheet 1

INVENTOR.
JOHN C. PIRTLE
BY
ATTORNEY

INVENTOR.
JOHN C. PIRTLE
BY
ATTORNEY

United States Patent Office 2,773,749
Patented Dec. 11, 1956

2,773,749
TOWER AGITATION SYSTEM

John C. Pirtle, Pueblo, Colo.

Application April 16, 1953, Serial No. 349,273

7 Claims. (Cl. 23—271)

This invention relates to systems particularly adapted for the extraction of values from ores of certain types and has as an object to provide an improved construction and organization of elements constituting such a system.

A further object of the invention is to provide an improved ore-processing system efficiently operable to extract the values as a solute from certain ores and to subsequently isolate such solute in a continuous, closed circuit.

A further object of the invention is to provide an ore-processing system characterized by conservation of reagents and utilization of by-products generated as an incident of system operation.

A further object of the invention is to provide an ore-processing system characterized by novel and efficient means for agitating the ore with and for reaction to a value-extracting solution.

A further object of the invention is to provide novel and improved means for agitating ore within a solution in reaction to gases derived as an incident of system operation.

A further object of the invention is to provide novel and improved means for repetitiously and progressively agitating ore within a solution and for circulating the ore-laden solution in controlled reaction to the input or gases derived as an incident of system operation.

A further object of the invention is to provide a novel and improved ore-processing system that is especially applicable to the practical treatment of manganese ores, that is readily adaptable to the treatment of a variety of specific ores, that is susceptible of practical development in large measure through the use of known and available apparatus elements, that is relatively simple and inexpensive of organization and operation, and that is highly efficient in attainment of the ends for which designed.

With the foregoing and other objects in view, my invention consists in the construction, arrangement, and operative combination of elements as hereinafter set forth, pointed out in my claims, and illustrated by the accompanying drawings, in which—

The effective processing of various ores for the extraction of values therefrom involves agitation of the ground ores in and with a liquid in the presence of appropriate reagents, whereby to separate the values as a solute apart from the gangue material in a form adapted for later recovery from the solution. As one example, it is known that natural manganese oxide ores when ground to a proper degree of fineness will yield their manganese content as a solute when agitated as a water pulp in the presence of an appropriate concentration of sulfur dioxide, whereby to condition the manganese for expedient recovery. Systems operable for the processing of manganese ores through the agency of sulfur dioxide have been heretofore less than commercially satisfactory, for various reasons, hence the instant invention is directed to the provision of a novel and improved system for the agitation of such ores by and in the presence of sulfur dioxide gases which is characterized by closed gas and solution circuits adapted to facilitate continuous operation of the system and to conserve solutions and reagents through repetitions, economical utilization thereof.

Figure 1:
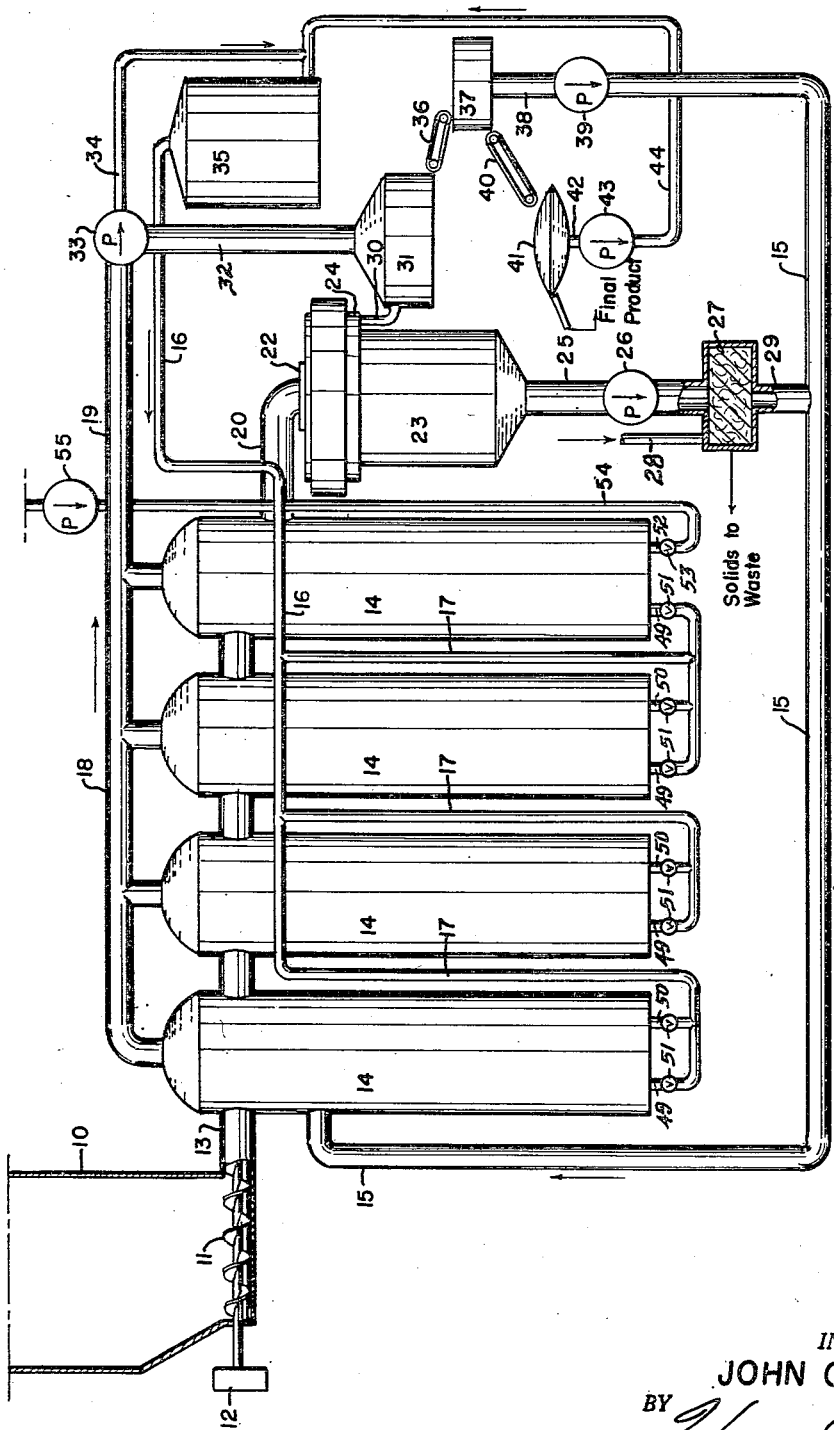
Figure 1 is a schematic diagram of apparatus elements and correlations typifying the improved system as constituted for the recovery of commercial manganese from common manganese ores.
Figure 2:
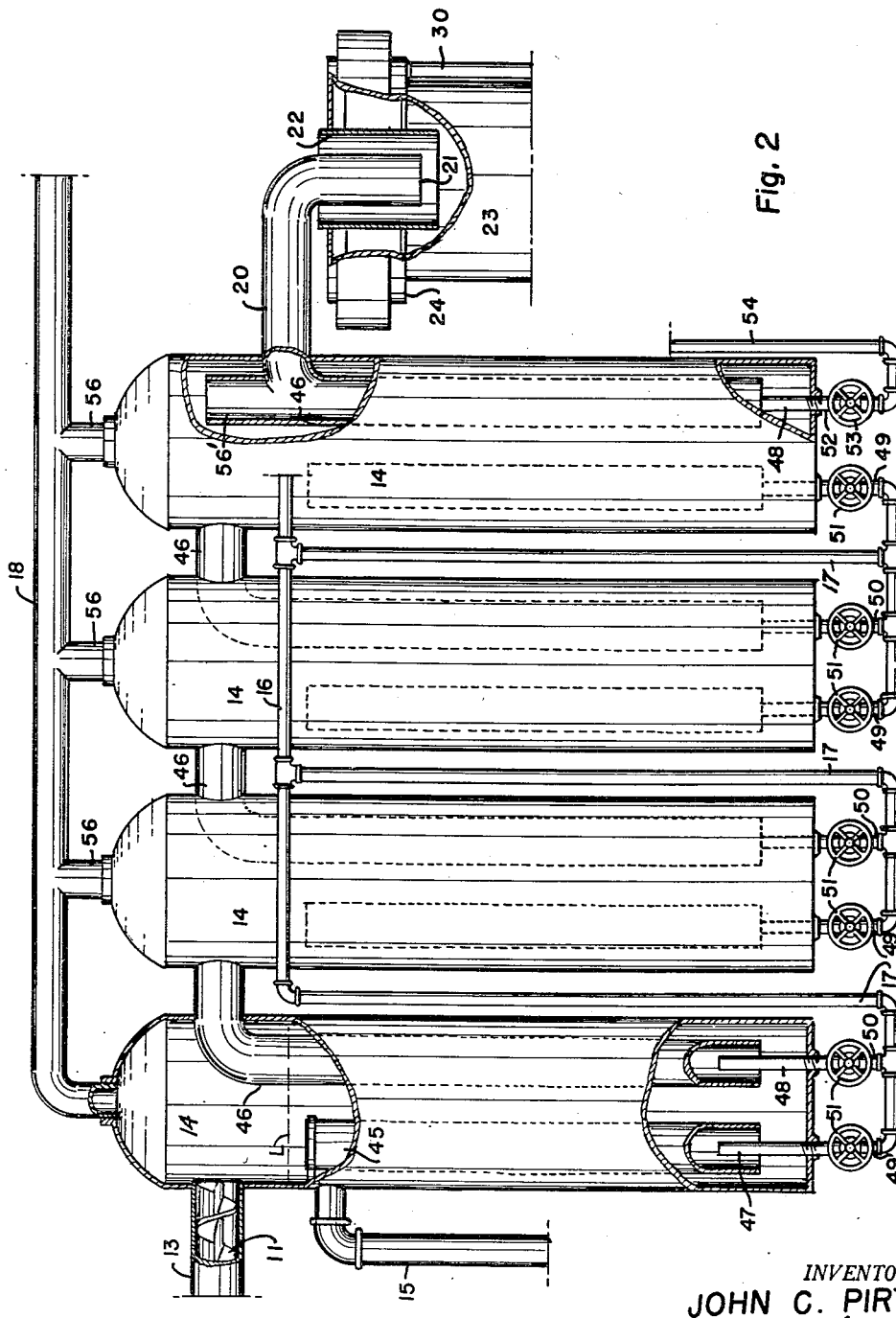
Figure 2 is a fragmentary, detail elevation, on an enlarged scale and with certain portions broken away to disclose otherwise concealed construction, of the agitation battery and associated elements represented in the preceding view.

As shown in Figure 1, the ore to be treated is fed, in appropriately ground condition, from a bin or hopper 10 by suitable means, such as an auger conveyer 11 powered as at 12 and delivering through a throat 13, to an initial agitating stage represented by a battery of towers 14, hereinafter more particularly described. The towers 14 of the agitation battery are charged with water to a considerable depth maintained in large measures by return of solution from later stages of the processing to the first of the towers 14 through a line 15 delivering at an elevated point of the tower. Sulfur dioxide gases are supplied through a header 16, expediently located above the liquid level of the towers 14, and through lines 17 leading from said header to and for delivery interiorly of each of the towers 14 in a manner effective to agitate and to circulate the tower contents as hereinafter set forth. The upper ends of said towers 14 communicate with a manifold 18 in such manner as to collect the gas charge within the upper end of each tower in and for travel through a common flow line 19 to which the said manifold delivers.

The ore pulp agitated within and circulated through the towers 14 is discharged from the agitation battery through an outflow line 20 within an open-collar baffle 22 at the upper end of a conventional thickener 23 furnished with the usual launder 24 for the collection of liquid separate from its previously-entrained solids. Since the values sought to be recovered are concentrated in the solution when the pulp leaves the agitation battery, the solids settled in the thickener 23 are exhausted from the latter through the agency of a line 25 and a pump 26, expediently of diaphragm type; the output from the pump 26 passing to a filter 27 served by a line 28 for the input of water from any convenient supply, and the filtrate from the filter 27 is returned to the line 15 through a branch 29 while the solids trapped in said filter are diverted by any appropriate agencies to waste. Thus, any reagents or values entrained with the settled solids removed from the thickener 23 are salvaged and returned to the agitation battery through the branch 29 and line 15.

From the launder 24, the value-charged solution passes, as through a line 30, to an evaporator 31 of conventional type and construction wherein the liquor is largely vaporized to leave a moist deposit of crystals representing an intermediate form of the values under recovery. The vapors generated at the evaporator 31 are collected and led through a line 32 to and through a pump 33 which simultaneously serves to induce flow thereinto from the line 19, and the output from the pump 33 passes through a line 34 to a gas receiver 35 from which the line 16 is supplied, all in a known and usual arrangement. The moist crystalline charge developed within the evaporator 31 is moved, as by means of a conveyor 36, to a filter 37 effective to extract any solution characterizing the crystalline mass, the filtrate from the filter 37 being returned through a line 38 and a pump 39 to the solution return line 15, thus completing the solution closed circuit.

The filtered cake of material collected within the filter 37 is moved, as by means of a conveyor 40, to a sintering hearth 41 of known character and design, where said cake is subjected to heat on the order of from 1000° C. to 1500° C. for the conversion of the cake material to a clinker of manganese oxides in form for practical use, which clinker leaves the hearth 41 as the final product of the system. At the sintering hearth 41 there is a large evolution of vapors and gases, principally sulfur dioxide, which emanations are collected and exhausted through a line 42 served by a vacuum pump 43 which delivers to a line 44 leading to the receiver 35, thus completing and closing the gas circuit of the system.

Organization of the agitation battery comprised from the towers 14 in a manner to agitate and circulate ore pulp in reaction and with effective exposure to the input of gases collected and circulated as hereinabove set forth is an important feature of the invention. The agitation battery is constituted as a plurality of like towers 14 intercoupled for progressive circulation of ore pulp therethrough in an appropriate number, preferably not less than four, suited to accomplish exposure of the ore to the solution of agitation to a degree and throughout a time period adequate for effecting the desired solutions of the ore values. In any expedient or desired construction, each of the towers 14 is a hollow, preferably cylindrical, axially-vertical member having a length, or height, considerably exceeding its lateral dimension and imperforate except as hereinafter described. Interiorly of each tower 14, an agitator column in the form of a straight, open-end tube 45 is fixed and supported in offset relation with and to spacedly parallel the axis of the associated tower 14, said tubes 45 being correspondingly related with each of the towers 14 to dispose the tube lower end in spaced relation with and above the bottom of the tower and the tube open upper end in a considerable spacing below the closed upper end of the tower at an elevation expediently below the level "L" of the normal pulp charge received within the tower. Paralleling the agitator column constituted by the tube 45, a transfer conduit 46 formed as a tube similar to the element 45 is fixed interiorly of each tower 14 with its open lower end at about the same level as the corresponding end of the tube 45 and with its upper end extending above the charge level "L" and at substantially a right angle through the side wall of the tower for connection of its open upper end with and to deliver interiorly of the next adjacent tower 14. Sealed through the lower end of each tower 14, a nozzle 47 upstands within the tower axially of the tube 45 with its output end somewhat above the lower end of the tube, and a similar nozzle 48 is sealed through the bottom of the tower in a similar relationship with the lower end of the tube 46, so that fluid under pressure delivered through either of said nozzles is directed for uprise within the associated tube or conduit. The nozzles 47 and 48 of all of the towers 14 except that one most remote from the ore input are served by gas from the closed gas circuit of the system delivered through the header 16 and branch lines 17 in any appropriate arrangement permitting selective control and regulation of the output of the separate nozzles, the illustrated arrangement including a flow line 49 connecting each nozzle 47 with an appropriate branch line 17, a flow line 50 connecting each nozzle 48 except that in the tower 14 last in the direction of pulp circulation with the line 17 serving the associated nozzle 47, and a control valve 51 in each of said lines 49 and 50. Conditioning the tower 14 terminating the agitation battery to function as a wash tower, the nozzle 48 of said terminal tower is connected by a line 52 through a valve 53 with a water supply line 54 leading, as through a pump 55, from any convenient source or supply of water for pressure delivery thereof through said nozzle 48, and within said terminal tower 14 the upper end of the conduit 46 is branched to provide an open extension 56' above the conduit lateral bend and opening within the associated tower below the upper end thereof; whereby to provide that any gas entrained with pulp circulating upwardly through said conduit 46 may escape to the tower interior and to also provide for input of water to said tower as an incident of the pulp circulation occasioned by operation of the associated nozzle 48. The throat 13 connects with and opens through a side wall at the upper end of the tower 14 first in the agitation battery for delivery of ore at a level preferably above the charge level "L," and the solution return line 15 preferably engages said first tower 14 for delivery therewithin at a point slightly below said charge level "L." Upper ends of the towers 14 are expediently tapered to converge upwardly toward apertures centrally thereof arranged to provide for gas flow from the tower upper ends and through associated connectors 56 to the manifold 18.

Constituted as shown and described, the agitation battery functions in operation of the improved system to receive ore delivered to the first tower unit through the throat 13, to effectively agitate such ore in a water solution and in the presence of sulfur dioxide characterizing the gas input through the header 16 and lines 17 of the gas circuit as a consequence of controlled gas delivery through the nozzles 47, to circulate the ore pulp successively through the towers 14 of the battery in maintained exposure to the gas-borne reagents as a consequence of regulated gas input through the nozzles 48, to collect the gas from the several towers 14 for reuse and recirculation by means of the manifold 18, to wash the processed ore charge as an incident of its circulation away from the agitating and circulating battery through the outflow line 20 served by the conduit 46 of the terminal tower as an incident of regulated water input to said tower and conduit through its nozzle 48, and to receive the salvaged reagent-charged solution from the system for reuse through the return line 15 delivering to the first tower 14. As should be manifest, agitation of the ore within and through the succession of towers 14 comprised within a given battery under the influence of appropriately regulated gas and water input to said towers effectuates a progressive and efficient extraction of values amenable to the reagents employed from the ore, thus concentrating such values as a solute in the liquor separated from the solids at the thickener 23 and conditioning such values for expedient recovery through the facilities characterizing the further operation of the system, all as above set forth. In the initial operation of the system, it may be desirable to add reagents to the agitation battery for development of desired reactions before the recirculated gases and solutions of the system are adequately potent, and it is clearly within the contemplation of the invention as well as within the skill of the known art to supply sulfuric acid, or the functional equivalent, to the pulp charge initially subjected to the action of the agitation battery shown and described.

Since changes, variations, and modifications in the particular form, construction, and arrangement of the system and system elements shown and described may be had without departing from the spirit of my invention, I wish to be understood as being limited solely by the scope of the appended claims, rather than by any details of the illustrative showing and foregoing description.

I claim as my invention:

1. In an ore-processing system having a closed gas circuit including means for the circulation of gas therethrough and solution circuit including means for the circulation of liquids therethrough, an agitation battery common to both said circuits for the conditioning of ore through exposure and reaction to flow in said gas circuit, said battery comprising a succession of like, closed, vertically-elongated towers communicating at their upper ends through a comomn manifold with the cutflow phase of said gas circuit, a tubular column wholly within and longitudinally of each said tower effective to agitate the tower contents in reaction to input of fluid pressure at its lower end, a conduit spacedly paralleling each said column interiorly of the associated tower and extending laterally through the wall thereof to deliver within the next succeeding tower for transfer of tower contents in reaction to input of fluid pressure at its lower end, the said conduit of the tower terminating the battery delivering to processing elements of the solution circuit, a gas return phase line, nozzles through the bases of said towers served by said gas return line and disposed for delivery within lower ends of said columns and conduits, means for selectively regulating the gas input through said nozzles, a solution circuit return phase line serving the tower first in the battery succession, and ore-feeding means serving said latter tower.

2. In an ore-processing system, an agitation battery comprising a succession of like, closed, vertically-elongated towers, outlets at the upper ends of said towers communicating with a common outflow manifold, a tubular column wholly within and longitudinally of each said tower effective to agitate the tower contents in reaction to input of fluid pressure at its lower end, a conduit spacedly paralleling each said column interiorly of the associated tower and extending at its upper end laterally through the tower wall for transfer of contents from the tower in reaction to input of fluid pressure at its lower end, the exterior portions of all said conduits other than that from the tower terminating the battery being connected for delivery to and within the next succeeding tower, nozzles upstanding through the tower floors in registration with and for delivery within said columns and conduits, means for the regulated infeed of fluid under pressure to each said nozzle, a solution inflow line serving the tower first in the battery succession, and ore-feeding means serving said latter tower.

3. The organization according to claim 2, wherein the tubular columns are characterized by open lower ends in spaced relation with the associated tower floor, by open upper ends spaced well below the associated tower top closure, and the nozzles serving said columns engage centrally of and extend well within the column lower ends.

4. The organization according to claim 2, wherein the tubular columns are characterized by open lower ends in spaced relation with the associated tower floor, by open upper ends spaced well below the associated tower top closure, the conduits are disposed with open lower ends substantially coplanar with the lower ends of the adjacent columns and intersect the associated tower wall above the level of the adjacent column upper ends, and the nozzles serving said columns and conduits engage centrally of and extend well within the open lower ends of the associated elements.

5. The organization according to claim 2, wherein all of the nozzles other than that serving the conduit of the terminal tower are served by gas under pressure from a common line, and the said nozzle serving the conduit of the terminal tower is served by a separate liquid pressure line.

6. The organization according to claim 2, wherein each of the nozzles serving the tower columns and conduits is served by an independent flow line, and a flow-regulating valve is associated with each said independent line.

7. The organization according to claim 2, wherein each of the nozzles save that serving the conduit of the terminal tower is served by gas under pressure from a common supply line, the nozzle serving said conduit of the terminal tower is supplied with liquid under pressure from a separate line, and the conduit of said terminal tower is extended upwardly within the tower above its lateral extension through the tower wall to an open upper end interiorly of the tower.

References Cited in the file of this patent

UNITED STATES PATENTS

| 966,389 | Durant et al. | Aug. 2, 1910 |
| 1,156,372 | Robinson | Oct. 12, 1915 |
| 1,204,069 | Robinson | Nov. 7, 1916 |

FOREIGN PATENTS

| 26,152 | Great Britain | 1908 |